(12) United States Patent
Kyle et al.

(10) Patent No.: US 12,049,163 B2
(45) Date of Patent: Jul. 30, 2024

(54) CONTROL APPARATUS, VEHICLE, NON-TRANSITORY COMPUTER READABLE MEDIUM, AND CONTROL METHOD

(71) Applicant: Toyota Jidosha Kabushiki Kaisha, Toyota (JP)

(72) Inventors: Roger Kyle, Nagoya (JP); Yuta Kodama, Toyota (JP); Corentin Marie C. Mossoux, Toyota (JP); Shunsuke Tanimori, Nagoya (JP); Rio Minagawa, Nagoya (JP); Dany Benjamin, Rowlett, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 17/390,255

(22) Filed: Jul. 30, 2021

(65) Prior Publication Data

US 2022/0032834 A1 Feb. 3, 2022

(30) Foreign Application Priority Data

Aug. 3, 2020 (JP) .................................. 2020-132048

(51) Int. Cl.
*B60P 1/36* (2006.01)
*B65G 15/30* (2006.01)
*B65G 47/90* (2006.01)

(52) U.S. Cl.
CPC .............. *B60P 1/36* (2013.01); *B65G 15/30* (2013.01); *B65G 47/90* (2013.01)

(58) Field of Classification Search
CPC ... B60P 1/36; B60P 1/00; B65G 15/30; B65G 47/90; G06Q 10/083; G06Q 50/40
See application file for complete search history.

(56) References Cited

U.S. PATENT DOCUMENTS

| | | | |
|---|---|---|---|
| 9,552,564 B1 * | 1/2017 | Martenis | G07C 9/00571 |
| 10,894,664 B1 * | 1/2021 | Brady | B65G 1/1378 |
| 11,565,881 B1 * | 1/2023 | Brady | G05D 1/0088 |
| 2014/0246257 A1 * | 9/2014 | Jacobsen | F41H 7/005 |
| | | | 180/14.2 |
| 2016/0370194 A1 * | 12/2016 | Colijn | G01C 21/343 |
| 2018/0259976 A1 * | 9/2018 | Williams | G05D 1/0027 |

(Continued)

FOREIGN PATENT DOCUMENTS

| | | |
|---|---|---|
| JP | H11217122 A | 8/1999 |
| JP | 2002-197593 A | 7/2002 |

(Continued)

*Primary Examiner* — Peter D Nolan
*Assistant Examiner* — Ashley L Redhead, Jr.
(74) *Attorney, Agent, or Firm* — Dinsmore & Shohl LLP

(57) ABSTRACT

A control apparatus is a control apparatus that is communicably connected to a first vehicle and a second vehicle, the control apparatus including a controller configured to: identify the first vehicle as a transfer destination for a luggage item stored in the second vehicle; read a targeted relative relationship between the second vehicle and the first vehicle; control the second vehicle based on the targeted relative relationship; and when a difference between the targeted relative relationship and an actual relative relationship is within an allowable range, convey the luggage item from the second vehicle to the first vehicle using a conveyer of the first vehicle or the second vehicle.

17 Claims, 7 Drawing Sheets

(56) References Cited

U.S. PATENT DOCUMENTS

| | | | |
|---|---|---|---|
| 2018/0373246 A1* | 12/2018 | Laughlin | G06Q 10/06311 |
| 2020/0122858 A1* | 4/2020 | Daw Perez | B66F 9/063 |
| 2021/0294352 A1* | 9/2021 | Kessler | G05D 1/0295 |
| 2023/0271540 A1* | 8/2023 | Smolov | B60P 1/52 |
| | | | 414/501 |

FOREIGN PATENT DOCUMENTS

| | | |
|---|---|---|
| JP | 2003-048476 A | 2/2003 |
| JP | 2004-338888 A | 12/2004 |
| JP | 2004-359362 A | 12/2004 |
| JP | 2010-215359 A | 9/2010 |
| JP | 2019-021200 A | 2/2019 |
| JP | 2019-111429 A | 7/2019 |
| JP | 2020-091571 A | 6/2020 |

* cited by examiner

FIG. 5

| ID | TARGETED RELATIVE RELATIONSHIP |
|---|---|
| R01 | INTER-VEHICLE DISTANCE 0 METER, RELATIVE VELOCITY 0 km/h, TO FACE EACH OTHER WITH DOORS OPEN |
| ⋮ | ⋮ |

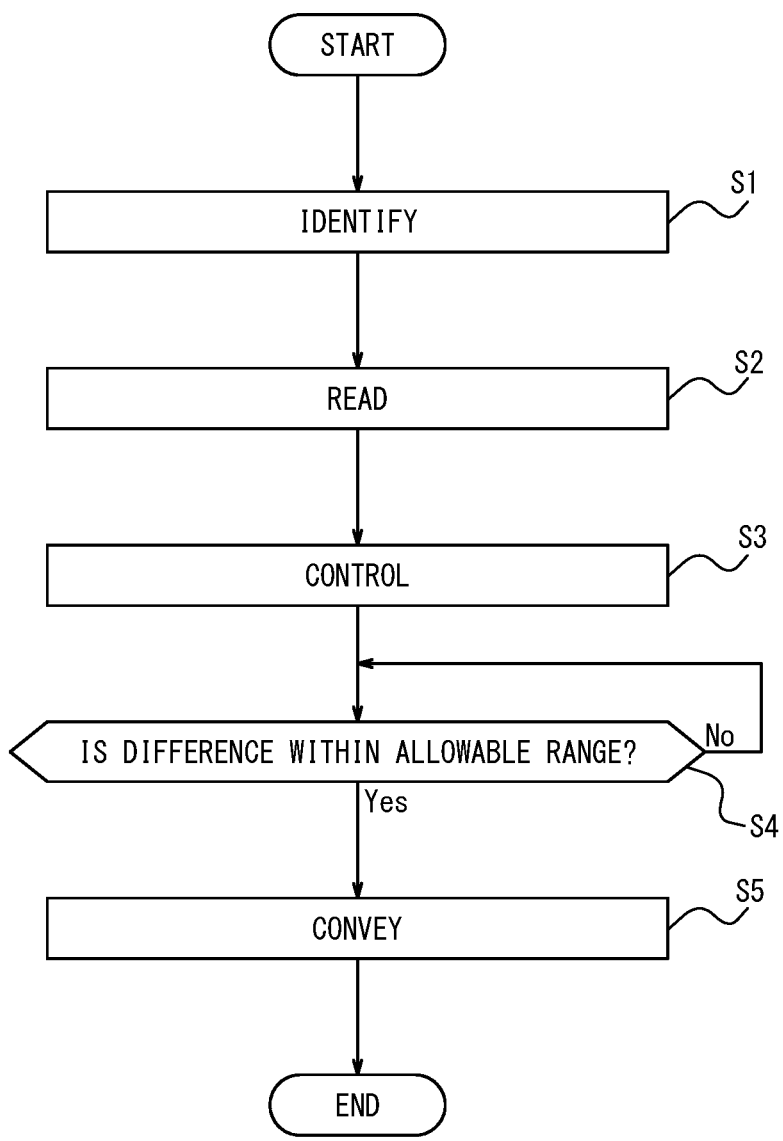

CONTROL APPARATUS, VEHICLE, NON-TRANSITORY COMPUTER READABLE MEDIUM, AND CONTROL METHOD

CROSS-REFERENCE TO RELATED APPLICATION

This application claims priority to Japanese Patent Application No. 2020-132048, filed on Aug. 3, 2020, the entire contents of which are incorporated herein by reference.

TECHNICAL FIELD

The present disclosure relates to a control apparatus, a vehicle, a program, and a control method.

BACKGROUND

Conventionally, there has been known a cargo vehicle having an arm mounted therein for loading and unloading a load (for example, Patent Literature [PTL] 1).

CITATION LIST

Patent Literature

PTL 1: JP 2003-048476 A

SUMMARY

It is conceivable to move and transfer luggage between vehicles for improving the efficiency of physical distribution. However, PTL 1 above does not consider how to ensure safety in moving luggage between vehicles.

It would be helpful to provide a control apparatus, a vehicle, a program, and a control method that can safely transfer luggage between vehicles.

A control apparatus according to an embodiment of the present disclosure is a control apparatus that is communicably connected to a first vehicle and a second vehicle, the control apparatus including a controller configured to:
  identify the first vehicle as a transfer destination for a luggage item stored in the second vehicle;
  read a targeted relative relationship between the second vehicle and the first vehicle;
  control the second vehicle based on the targeted relative relationship; and
  when a difference between the targeted relative relationship and an actual relative relationship is within an allowable range, convey the luggage item from the second vehicle to the first vehicle using a conveyer of the first vehicle or the second vehicle.

A program according to an embodiment of the present disclosure is configured to cause a computer as a control apparatus that is communicably connected to a first vehicle and a second vehicle, to execute operations, the operations including:
  identifying the first vehicle as a transfer destination for a luggage item stored in the second vehicle;
  reading a targeted relative relationship between the second vehicle and the first vehicle;
  controlling the second vehicle based on the targeted relative relationship; and
  when a difference between the targeted relative relationship and an actual relative relationship is within an allowable range, conveying the luggage item from the second vehicle to the first vehicle using a conveyer of the first vehicle or the second vehicle.

A control method according to an embodiment of the present disclosure is a control method by a control apparatus that is communicably connected to a first vehicle and a second vehicle, the control method including:
  identifying the first vehicle as a transfer destination for a luggage item stored in the second vehicle;
  reading a targeted relative relationship between the second vehicle and the first vehicle;
  controlling the second vehicle based on the targeted relative relationship; and
  when a difference between the targeted relative relationship and an actual relative relationship is within an allowable range, conveying the luggage item from the second vehicle to the first vehicle using a conveyer of the first vehicle or the second vehicle.

A control device, a vehicle, a program, and a control method according to an embodiment of the present disclosure can safely transfer luggage between vehicles.

BRIEF DESCRIPTION OF THE DRAWINGS

In the accompanying drawings:
FIG. 5 is a diagram illustrating a data structure of a targeted relative relationship database (DB);
FIG. 7 is a flow chart illustrating operations of the control apparatus.

DETAILED DESCRIPTION

Figure 1:
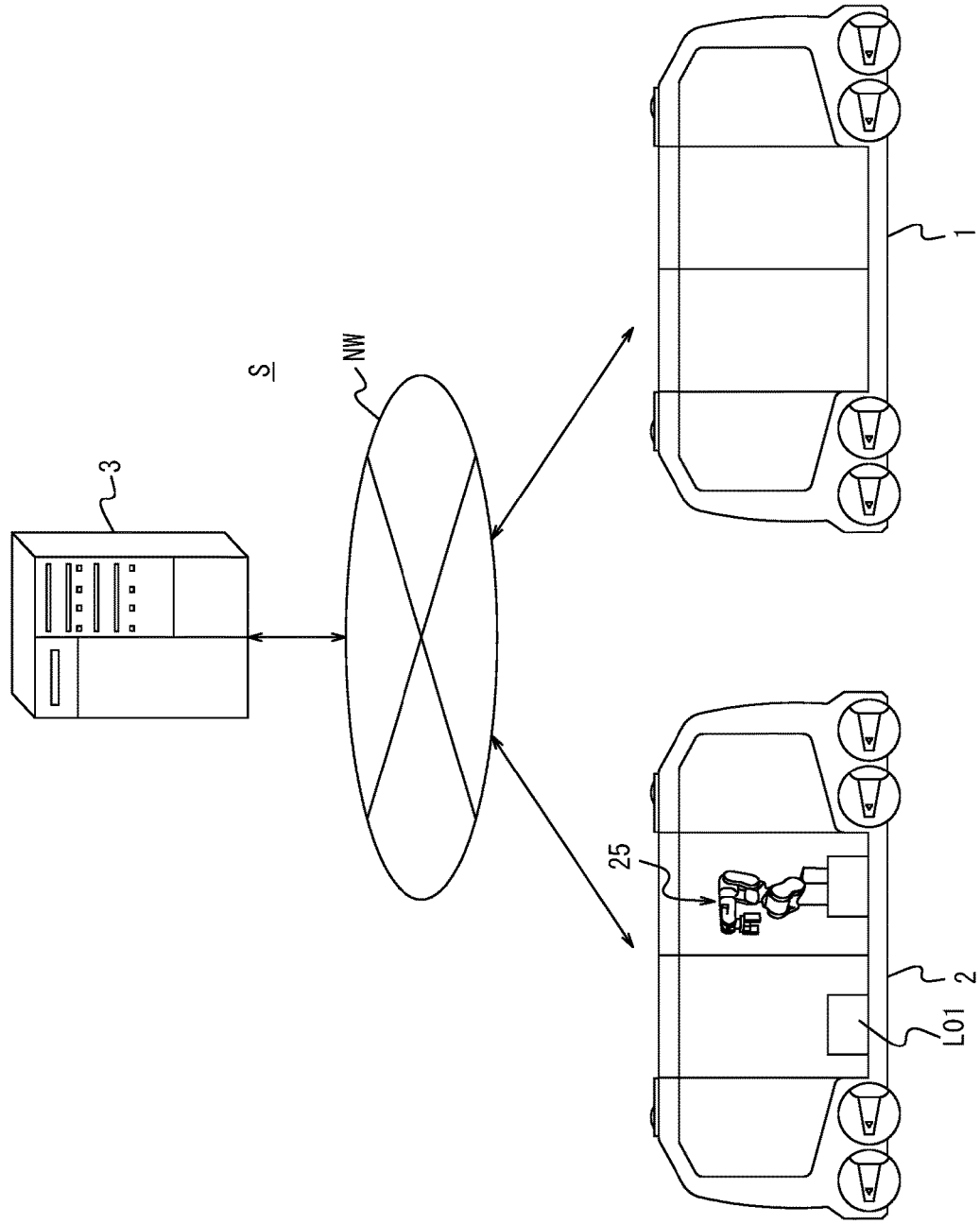
FIG. 1 is a schematic diagram of an information processing system.

FIG. 1 is a schematic diagram of an information processing system S according to the present embodiment. The information processing system S includes a first vehicle 1, a second vehicle 2, and a control apparatus 3, which are communicably connected to one another via a network NW. FIG. 1 illustrates one each of the first vehicle 1, the second vehicle 2, and the control apparatus 3 for simplification of explanation. However, the number of the first vehicle 1, the number of the second vehicle 2, and the number of the control apparatus 3 are not limited to one each. For example, the processing to be executed by the control apparatus 3 of the present embodiment may be executed by a plurality of control apparatuses distributed and arranged. Examples of the network NW include a mobile communication network and the Internet.

An outline of the processing to be executed by the control apparatus 3 according to the present embodiment will be described. The control apparatus 3 identifies the first vehicle 1 as a transfer destination of a luggage item stored in the second vehicle 2, and reads a targeted relative relationship between the second vehicle 2 and the first vehicle 1. The control apparatus 3 further controls the second vehicle 2 based on the targeted relative relationship, and when a difference between the targeted relative relationship and an actual relative relationship is within an allowable range, the control apparatus 3 conveys the luggage item from the second vehicle 2 to the first vehicle 1, using a conveyer 25. This configuration enables the control apparatus 3 to convey a luggage item after confirming that the difference is within an allowable range, and thus can safely transfer luggage between the vehicles.

The first vehicle 1 and the second vehicle 2 include, for example, any type of automobile such as gasoline vehicles, diesel vehicles, an HV, a PHV, an EV, or an FCV. The term "HV" is an abbreviation of Hybrid Vehicle. The term "PHV" is an abbreviation of Plug-in Hybrid Vehicle. The term "EV" is an abbreviation of Electric Vehicle. The term "FCV" is an abbreviation of Fuel Cell Vehicle. The operations of the first vehicle 1 and the second vehicle 2 may be automated at any level. The level of automation is, for example, one of Level 1 to Level 5 in the level classification of the SAE. The name "SAE" is an abbreviation of Society of Automotive Engineers. The first vehicle 1 and the second vehicle 2 may be MaaS-dedicated vehicles. The term "MaaS" is an abbreviation of Mobility as a Service. As an alternative example, the first vehicle 1 and the second vehicle 2 may each be driven by a driver.

Figure 2:
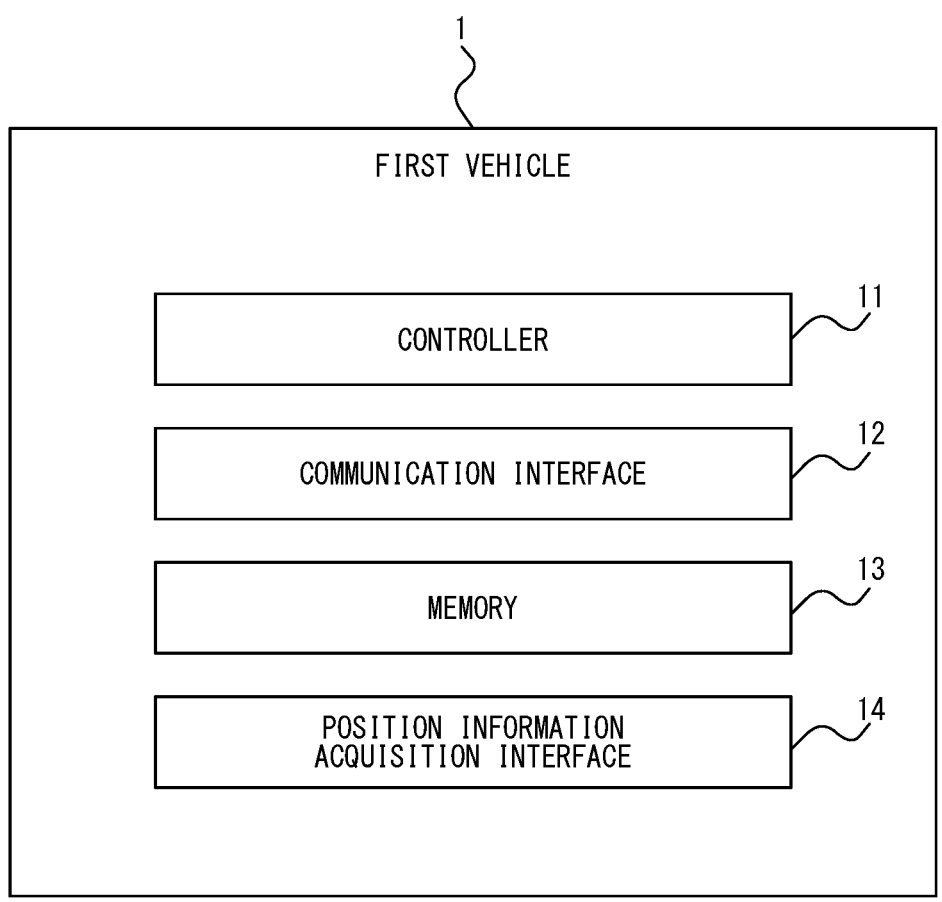
FIG. 2 is a block diagram illustrating a configuration of a first vehicle.

With reference to FIG. 2, an internal configuration of the first vehicle 1 will be described in detail.

The first vehicle 1 includes a controller 11, a communication interface 12, a memory 13, and a positional information acquisition interface 14. The components of the first vehicle 1 are communicably connected to one another via an in-vehicle networks such as a Controller Area Network (CAN) or dedicated lines.

The controller 11 includes, for example, at least one general purpose processor including a Central Processing Unit (CPU) or a Micro Processing Unit (MPU). The controller 11 may include at least one dedicated processor that is dedicated to specific processing. The controller 11 may include at least one dedicated circuit instead of a processor. Examples of the dedicated circuit may include a Field-Programmable Gate Array (FPGA) and an Application Specific Integrated Circuit (ASIC). The controller 11 may include an Electronic Control Unit (ECU).

The communication interface 12 includes at least one communication module, for connecting to the network NW, the communication module being compliant with wired or wireless Local Area Network (LAN) standard. The communication interface 12 may include at least one module compliant with a mobile communication standard such as the 4th Generation (4G) standard or the 5th Generation (5G) standard. The communication interface 12 may include at least one communication module compliant with a standard such as a short-range wireless communication standard or specification such as Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 is configured to transmit and receive any information via the network NW. An example of the information includes positional information acquired through the Global Positioning System (GPS). The communication interface 12 performs inter-vehicle communication to transmit and receive any information with other vehicles. For example, the communication interface 12 can authenticate other vehicles by inter-vehicle communication.

The memory 13 is, for example, a semiconductor memory, a magnetic memory, or an optical memory, but is not limited thereto. The memory 13 may function as, for example, a main memory, an auxiliary memory, or a cache memory. The memory 13 may store information resulting from analysis or processing performed by the controller 11. The memory 13 may also store various types of information or the like related to operations and control of the first vehicle 1. The memory 13 may store a system program, an application program, embedded software, and the like.

The positional information acquisition interface 14 includes, for example, a receiver such as an antenna. The positional information acquisition interface 14 obtains positional information for the first vehicle 1, using, for example, the GPS.

Figure 3:
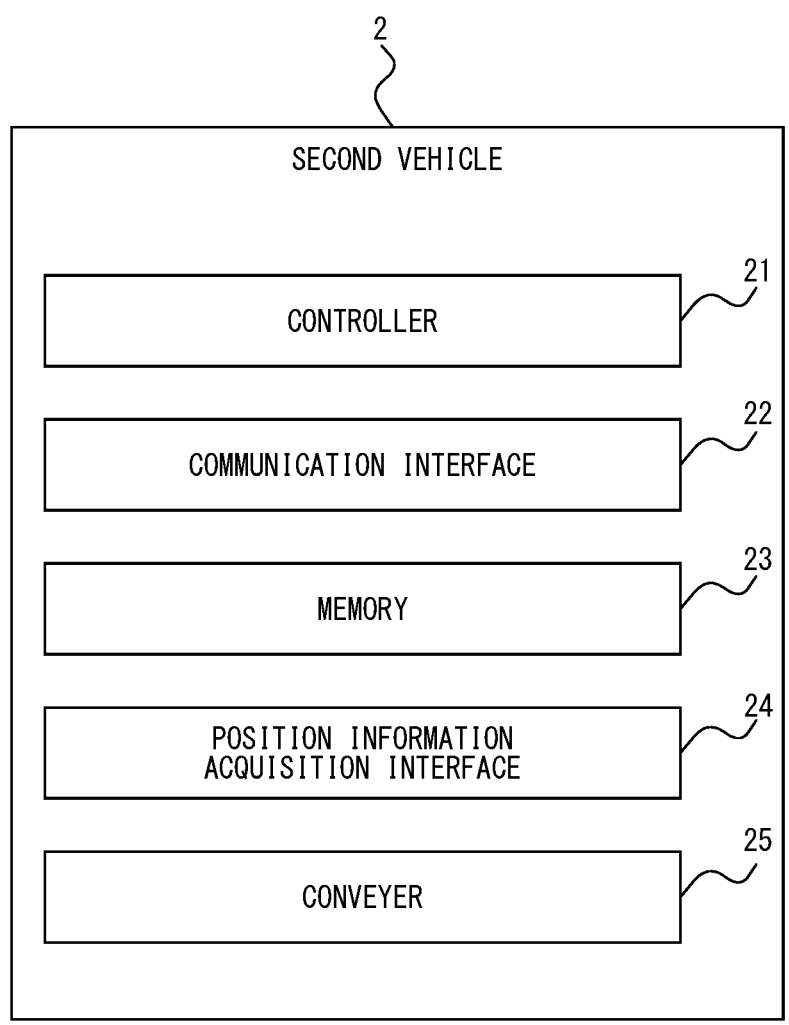
FIG. 3 is a block diagram illustrating a configuration of a second vehicle.

With reference to FIG. 3, an internal configuration of the second vehicle 2 will be described in detail.

The second vehicle 2 includes a controller 21, a communication interface 22, a memory 23, a positional information acquisition interface 24, and the conveyer 25. In the present embodiment, the conveyer 25 is included in the second vehicle 2; however, as an alternative example, the conveyer 25 may be included in at least one of the first vehicle 1 and the second vehicle 2. The components of the second vehicle 2 are communicably connected to one another via in-vehicle network such as, for example, a Controller Area Network (CAN) or dedicated lines.

In the present embodiment, the hardware configurations of the controller 21, the communication interface 22, the memory 23, and the positional information acquisition interface 24 is the same as the hardware configurations of the controller 11, the communication interface 12, the memory 13, and the positional information acquisition interface 14 of the first vehicle 1. Therefore, a description thereof is omitted here.

The conveyer 25 is an apparatus for conveying at least one item of any luggage. The conveyer 25 may be, for example, a robotic arm illustrated in FIG. 1. In this case, the conveyer 25 lifts and moves a luggage item. As an alternative example, the conveyer 25 may be a conveyor belt. In this case, the conveyer 25 drives the conveyor belt to move a luggage item placed on the conveyor belt.

The conveyer 25 is installed inside the second vehicle 2 near a door as illustrated in FIG. 1. As an alternative example, however, the conveyer 25 may be installed on a deck, in a luggage compartment, in a trunk, on an outer surface, or at a special purpose opening, or the like of the second vehicle 2.

The control apparatus 3 may be a server that assists a provider in providing a vehicle dispatch service. The control apparatus 3 may be, for example, installed in a facility dedicated to a vehicle dispatch provider or in a shared facility including a data center. The control apparatus 3 controls operations of the first vehicle 1 and the second vehicle 2. As an alternative example, the control apparatus 3 may be mounted on the second vehicle 2.

Figure 4:
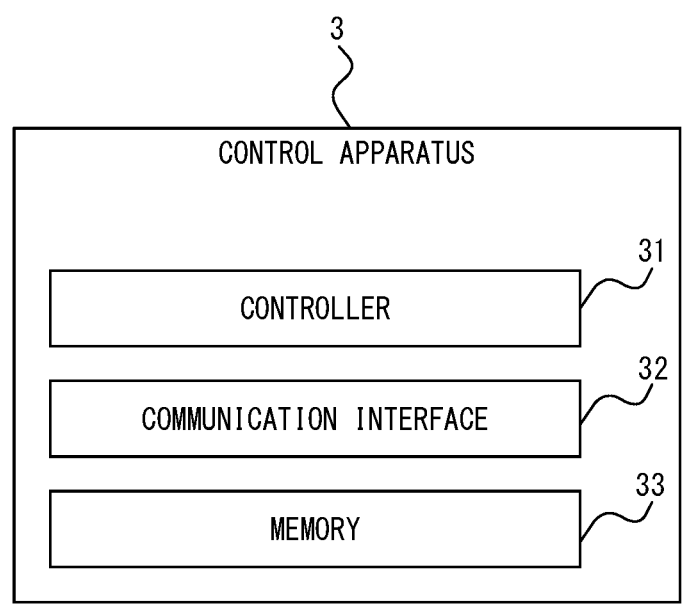
FIG. 4 is a block diagram illustrating a configuration of a control apparatus.

With reference to FIG. 4, an internal configuration of the control apparatus 3 will be described in detail.

The control apparatus 3 includes a controller 31, a communication interface 32, and a memory 33. The components of the control apparatus 3 are communicably connected to one another via, for example, a dedicated line.

In the present embodiment, the hardware configurations of the controller 31, the communication interface 32, and the memory 33 of the control apparatus 3 may be the same as the hardware configurations of the controller 11, the communication interface 12, and the memory 13 of the first vehicle 1. Therefore, a description thereof is omitted here.

The memory 33 includes a targeted relative relationship DB illustrated in FIG. 5. The targeted relative relationship DB stores information that indicates the details of the targeted relative relationship, in association with an ID as an identifier. The details of the targeted relative relationship will be described later. As an alternative example, the targeted relative relationship DB may be stored in a storage apparatus external to the control apparatus 3 and accessed from the control apparatus 3.

Hereinafter, processing to be executed in the information processing system S according to the present embodiment will be described in detail. Here, as an example, a situation in which the second vehicle 2 conveys a luggage item deposited from a user will be described.

The control apparatus 3 determines that a luggage item being carried by the second vehicle 2 needs to be transferred to the first vehicle 1 for some operational reasons. The control apparatus 3 identifies the first vehicle 1 as a transfer destination for the luggage item.

The control apparatus 3 reads the targeted relative relationship between the first vehicle 1 and the second vehicle 2, from the targeted relative relationship DB illustrated in FIG. 5. The targeted relative relationship is a relative relationship between the vehicles that is desirable to provide for safe transfer of a luggage item. The targeted relative relationship illustrated in FIG. 5 is that the distance between the first vehicle 1 and the second vehicle 2 is 0 meter, and the relative speed between the first vehicle 1 and the second vehicle 2 is 0 km/h. As an alternative example, the targeted relative relationship may be, for example, at least one of the following conditions:

Condition 1: The distance between the vehicles is within a predetermined value (e.g., 2 meters).
Condition 2: The relative speed between the vehicles is within a predetermined value (for example, the speed is within 10 km/h, or the speed is 0 km/h) (at this time, the first vehicle 1 and the second vehicle 2 may both be stopped, or at least one of the vehicles may be traveling).
Condition 3: A door of the first vehicle 1 and a door of the second vehicle 2 face each other in open state.
Condition 4: The vehicles are coupled to each other in tandem or in parallel, etc.

The control apparatus 3 controls the second vehicle 2, based on the targeted relative relationship. For example, the control apparatus 3 controls the second vehicle 2 to move to the vicinity of the first vehicle 1 so that the targeted relative relationship is satisfied. The control apparatus 3 can determine the positions of the first vehicle 1 and the second vehicle 2, based on positional information acquired from each of the positional information acquisition interface 14 and the positional information acquisition interface 24. At this time, the second vehicle 2 identifies the first vehicle 1 by, for example, inter-vehicle communication. As an alternative example, the second vehicle 2 may capture an image of its surroundings and analyze the captured image, to thereby identify the first vehicle 1.

The control apparatus 3 periodically or unperiodically determines an actual relative relationship between the first vehicle 1 and the second vehicle 2. The actual relative relationship indicates a relative relationship in reality between the first vehicle 1 and the second vehicle 2.

The control apparatus 3 periodically or unperiodically determines whether a difference between the targeted relative relationship and the actual relative relationship is within an allowable range. For example, when at least some of Conditions mentioned above (for example, any one of Conditions 1 to 4, any two of Conditions 1 to 4, any three of Conditions 1 to 4, and all of Conditions 1 to 4) included in the targeted relative relationship are all satisfied, the difference is determined as being within an allowable range.

Figure 6:
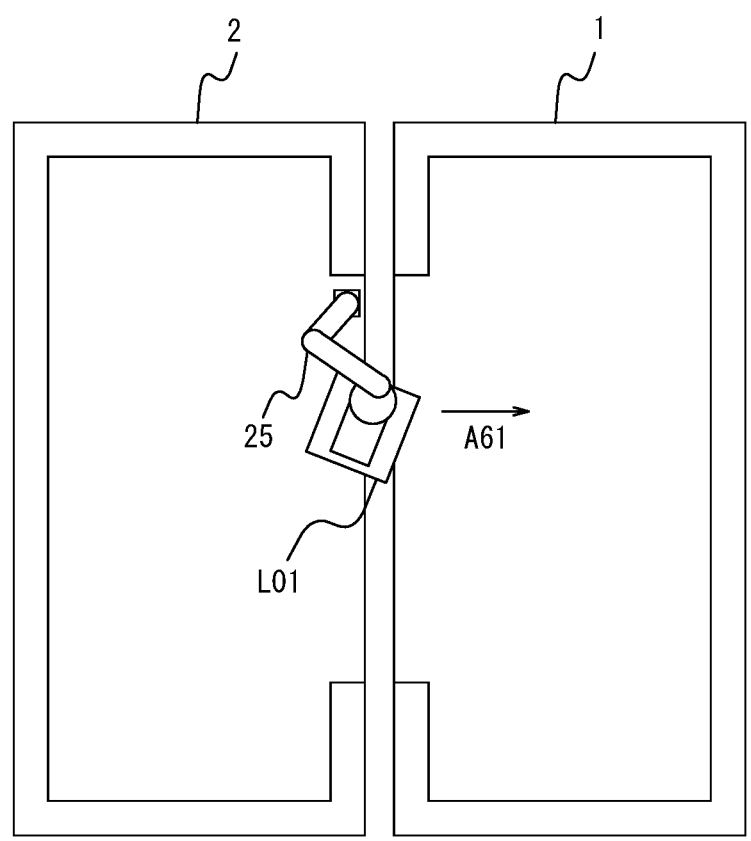
FIG. 6 is a diagram illustrating conveyance of a luggage item.

When the control apparatus 3 determines that the difference is within an allowable range, the control apparatus 3 uses the conveyer 25 of the second vehicle 2 to convey a luggage item L01 stored in the second vehicle 2 to the first vehicle 1 in a direction of the arrow A61, as illustrated in FIG. 6. In FIG. 6, Conditions 1 to 3, among Conditions mentioned above, are satisfied.

As an additional example, the control apparatus 3 may adjust the position at which the luggage item L01 is to be conveyed, according to a degree of traffic congestion on a road on which the first vehicle 1 and the second vehicle 2 are present, prior to conveying the luggage item L01. Specifically, the control apparatus 3 acquires, from a server that provides information on the degree of traffic congestion (for example, information on accidents, congestion, or traffic regulations) on roads, information on the degree of traffic congestion on a road on which the first vehicle 1 and the second vehicle 2 are traveling or stopped. When the control apparatus 3 detects traffic congestion on a road on which the first vehicle 1 and the second vehicle 2 are traveling or stopped, the control apparatus 3 controls the first vehicle 1 and the second vehicle 2 to move to another road so as to convey the luggage item L01 on that road.

The conveyed luggage item L01 is stored in the first vehicle 1. When the first vehicle 1 detects that the luggage item L01 has been stored in the first vehicle 1, the first vehicle 1 travels according to a command from the control apparatus 3.

Referring to FIG. 7, a control method by the controller 31 of the control apparatus 3 will be described.

In Step S1, the control apparatus 3 identifies the first vehicle 1 as a transfer destination for a luggage item stored in the second vehicle 2.

In Step S2, the control apparatus 3 reads, from the memory 33, the targeted relative relationship between the second vehicle 2 and the first vehicle 1.

In Step S3, the control apparatus 3 controls the second vehicle 2, based on the targeted relative relationship. For example, the control apparatus 3 controls the second vehicle 2 to move so that the targeted relative relationship is satisfied.

In step S4, the control apparatus 3 determines whether the difference between the targeted relative relationship and the actual relative relationship is within an allowable range.

When No in Step S4, the control apparatus 3 executes Step S4 again.

When Yes in Step S4, the control apparatus 3 conveys the luggage item from the second vehicle 2 to the first vehicle 1 in Step S5, using the conveyer 25 (e.g., a robotic arm or a conveyor belt) of the second vehicle 2. The control apparatus 3 may adjust a position at which the luggage item is to be conveyed, depending on the degree of traffic congestion on a road on which the first vehicle 1 and the second vehicle 2 are present.

As described above, according to the present embodiment, a control apparatus 3 identifies a first vehicle 1 as a transfer destination for a luggage item stored in a second vehicle 2, and reads a targeted relative relationship between the second vehicle 2 and the first vehicle 1. The control apparatus 3 further controls the second vehicle 2 based on the targeted relative relationship, and when a difference between the targeted relative relationship and the actual relative relationship is within an allowable range, the control apparatus 3 uses the conveyer 25 to convey the luggage item from the second vehicle 2 to the first vehicle 1. This configuration enables the control apparatus 3 to convey a luggage item after confirming that the difference is within an allowable range, and thus the control apparatus 3 can safely transfer the luggage item between the vehicles.

According to the present embodiment, the targeted relative relationship includes a first condition in which the distance between the first vehicle 1 and the second vehicle 2 is within a predetermined value; when at least the first condition is satisfied, the difference is within an allowable range. The targeted relative relationship includes a second condition in which the relative speed of the first vehicle 1 and the second vehicle 2 is within a predetermined value; when at least the second condition is satisfied, and the difference is within an allowable range. The targeted relative relationship includes a third condition in which a door of the first vehicle 1 and a door of the second vehicle 2 face each other in open state; when at least the third condition is satisfied, the difference is within an allowable range. Further, the targeted relative relationship includes a fourth condition in which the first vehicle 1 and the second vehicle 2 are coupled to each other; when at least the fourth condition is satisfied, the difference is within an allowable range. This configuration enables the control apparatus 3 to further improve safety in transferring a luggage item.

Also according to the present embodiment, the conveyer 25 includes a robotic arm or a conveyor belt, and the controller 31 controls the robotic arm or the conveyor belt to convey the luggage item. This configuration enables the control apparatus 3 to smoothly convey the luggage item.

Further, according to the present embodiment, the controller 31 adjusts a position at which the luggage item is to be conveyed, in accordance with a degree of traffic congestion on a road on which the first vehicle 1 and the second vehicle 2 are present. This configuration enables the control apparatus 3 to reduce conveyance on the congested road, thereby avoiding the obstruction of traffic on the road.

While the present disclosure has been described with reference to the drawings and examples, it should be noted that various modifications and revisions can be implemented by those skilled in the art based on the present disclosure. Other alterations can be made without departing from the spirit of the present disclosure. For example, functions or the like included in each step can be rearranged without logical inconsistency, and a plurality of steps can be combined into one or divided.

For example, in the aforementioned embodiment, a program configured to execute all or some of the functions or processing of the control apparatus 3 can be recorded on a computer readable recording medium. The computer readable recording medium includes a non-transitory computer readable medium and may be a magnetic recording device, an optical disc, a magneto-optical recording medium, or a semiconductor memory. The program is distributed, for example, by sale, transfer, or rental of a portable recording medium such as a Digital Versatile Disc (DVD) or a Compact Disc Read Only Memory (CD-ROM) on which the program is recorded. The program may be distributed by storing the program in a storage of any server and transmitting the program from the server to another computer. The program may also be provided as a program product. The present disclosure may also be realized as a program that can be executed by a processor.

The invention claimed is:

1. A control apparatus that is communicably connected to a first vehicle and a second vehicle, the control apparatus comprising a controller configured to:

identify the first vehicle as a transfer destination for a luggage item stored in the second vehicle;
read a targeted relative relationship between the second vehicle and the first vehicle;
control the second vehicle based on the targeted relative relationship; and
when a difference between the targeted relative relationship and an actual relative relationship is within an allowable range, convey the luggage item from the second vehicle to the first vehicle using a conveyer of the first vehicle or the second vehicle,
wherein the targeted relative relationship includes a second condition in which a relative speed between the first vehicle and the second vehicle is within a predetermined value, and when at least the second condition is satisfied, the difference is within an allowable range.

2. The control apparatus according to claim 1,
wherein the targeted relative relationship includes a first condition in which a distance between the first vehicle and the second vehicle is within a predetermined value, and when at least the first condition is satisfied, the difference is within an allowable range.

3. The control apparatus according to claim 1,
wherein the targeted relative relationship includes a third condition in which a door of the first vehicle and a door of the second vehicle face each other in open state, and when at least the third condition is satisfied, the difference is within an allowable range.

4. The control apparatus according to claim 1,
wherein the targeted relative relationship includes a fourth condition in which the first vehicle and the second vehicle are coupled to each other, and when at least the fourth condition is satisfied, the difference is within an allowable range.

5. The control apparatus according to claim 1,
wherein the conveyer includes a robotic arm or a conveyer belt, and the controller is configured to control the robotic arm or the conveyer belt to convey the luggage item.

6. The control apparatus according to claim 1,
wherein the controller is configured to adjust a position at which the luggage item is to be conveyed, according to a degree of traffic congestion on a road on which the first vehicle and the second vehicle are present.

7. A vehicle having the control apparatus according to claim 1 mounted therein.

8. A non-transitory computer readable medium storing a program configured to cause a computer as a control apparatus that is communicably connected to a first vehicle and a second vehicle, to execute operations, the operations comprising:

identifying the first vehicle as a transfer destination for a luggage item stored in the second vehicle;
reading a targeted relative relationship between the second vehicle and the first vehicle;
controlling the second vehicle based on the targeted relative relationship; and
when a difference between the targeted relative relationship and an actual relative relationship is within an allowable range, conveying the luggage item from the second vehicle to the first vehicle using a conveyer of the first vehicle or the second vehicle,
wherein the targeted relative relationship includes a second condition in which a relative speed between the first vehicle and the second vehicle is within a predetermined value, and when at least the second condition is satisfied, the difference is within an allowable range.

9. The non-transitory computer readable medium according to claim 8,
wherein the targeted relative relationship includes a first condition in which a distance between the first vehicle and the second vehicle is within a predetermined value, and when at least the first condition is satisfied, the difference is within an allowable range.

10. The non-transitory computer readable medium according to claim 8,
wherein the targeted relative relationship includes a third condition in which a door of the first vehicle and a door of the second vehicle face each other in open state, and when at least the third condition is satisfied, the difference is within an allowable range.

11. The non-transitory computer readable medium according to claim 8,
wherein the targeted relative relationship includes a fourth condition in which the first vehicle and the second vehicle are coupled to each other, and when at least the fourth condition is satisfied, the difference is within an allowable range.

12. The non-transitory computer readable medium according to claim 8,
wherein the conveyer includes a robotic arm or a conveyer belt, and the control apparatus controls the robotic arm or the conveyer belt to convey the luggage item.

13. A control method by a control apparatus that is communicably connected to a first vehicle and a second vehicle, the control method comprising:
identifying the first vehicle as a transfer destination for a luggage item stored in the second vehicle;
reading a targeted relative relationship between the second vehicle and the first vehicle;
controlling the second vehicle based on the targeted relative relationship; and
when a difference between the targeted relative relationship and an actual relative relationship is within an allowable range, conveying the luggage item from the second vehicle to the first vehicle using a conveyer of the first vehicle or the second vehicle,
wherein the targeted relative relationship includes a second condition in which a relative speed between the first vehicle and the second vehicle is within a predetermined value, and when at least the second condition is satisfied, the difference is within an allowable range.

14. The control method according to claim 13,
wherein the targeted relative relationship includes a first condition in which a distance between the first vehicle and the second vehicle is within a predetermined value, and when at least the first condition is satisfied, the difference is within an allowable range.

15. The control method according to claim 13,
wherein the targeted relative relationship includes a third condition in which a door of the first vehicle and a door of the second vehicle face each other in open state, and when at least the third condition is satisfied, the difference is within an allowable range.

16. The control method according to claim 13,
wherein the targeted relative relationship includes a fourth condition in which the first vehicle and the second vehicle are coupled to each other, and when at least the fourth condition is satisfied, the difference is within an allowable range.

17. The control method according to claim 13,
wherein the conveyer includes a robotic arm or a conveyer belt, and the control apparatus controls the robotic arm or the conveyer belt to convey the luggage item.

* * * * *